United States Patent
Holland et al.

(10) Patent No.: US 8,102,419 B1
(45) Date of Patent: Jan. 24, 2012

(54) METHOD AND APPARATUS FOR IMPROVED SCANNING OF FILM

(75) Inventors: David E. Holland, Granda Hills, CA (US); Gavin W. Schutz, Glendale, CA (US)

(73) Assignee: Deluxe Media Services LLC, Hollywood, CA (US)

( * ) Notice: Subject to any disclaimer, the term of this patent is extended or adjusted under 35 U.S.C. 154(b) by 0 days.

(21) Appl. No.: 08/066,996

(22) Filed: May 24, 1993

(51) Int. Cl.
*H04N 5/253* (2006.01)
*H04N 3/36* (2006.01)

(52) U.S. Cl. .............................. 348/96; 348/97

(58) Field of Classification Search .............. 348/96–97, 348/911, 443, 444, 446, 453, 242, 450, 473, 348/607, 100, 104, 103, 106; *H04N 5/208*
See application file for complete search history.

(56) References Cited

U.S. PATENT DOCUMENTS

| | | | | |
|---|---|---|---|---|
| 4,270,150 A | * | 5/1981 | Diermann et al. ............. 360/10 |
| 4,312,017 A | * | 1/1982 | Poetsch ........................ 358/214 |
| 4,616,251 A | * | 10/1986 | Pritchard et al. ............. 348/450 |
| 4,646,133 A | * | 2/1987 | Blanchard et al. ............ 348/450 |
| 4,876,596 A | * | 10/1989 | Faroudja ........................ 348/450 |
| 5,084,755 A | * | 1/1992 | Ozaki .............................. 348/97 |
| 5,136,385 A | * | 8/1992 | Campbell ...................... 348/607 |
| 5,161,006 A | * | 11/1992 | Monta et al. .................. 348/663 |
| 5,293,225 A | * | 3/1994 | Nishiyama et al. ........... 348/242 |
| 5,353,119 A | * | 10/1994 | Dorricott et al. .............. 348/446 |
| 5,384,599 A | * | 1/1995 | Casavant et al. .............. 348/473 |

* cited by examiner

*Primary Examiner* — Ngoc-Yen Vu
(74) *Attorney, Agent, or Firm* — Fitch, Even, Tabin & Flannery (57) ABSTRACT

An improved method and apparatus for scanning of anamorphic film utilizes increased number of scans and combination of scan lines for video output generation. A progressive raster scan is made of the film and stored in a frame memory. The spacing between the scan lines is made smaller than for the conventional scanning of an anamorphic image. In the preferred embodiment, the spacing between the scan lines for a 2:1 anamorphic image equals the spacing for scanning of a non-anamorphic image. The scan lines are retrieved from the memory and combined, preferably with the two nearest neighbors of the scan line. Optionally, the combined lines are weighted, preferably with the center scan line having larger weight. Subsequent video output lines are formed by repeating the process. Progressive video output or interlace output is provided as desired.

20 Claims, 6 Drawing Sheets

METHOD AND APPARATUS FOR IMPROVED SCANNING OF FILM

FIELD OF THE INVENTION

This invention relates to the conversion of images from film to an electronic format. More particularly, it relates to the telecine scanning of film recorded in an anamorphic format.

BACKGROUND OF THE INVENTION

Images are often shot on photographic film. The images may be displayed from the film, such as direct projection of motion picture film in a theater. Also, images on film are converted from film to an electronic medium, such as videotape, which is then used for mass distribution or broadcast via television or cable.

Figure 1:
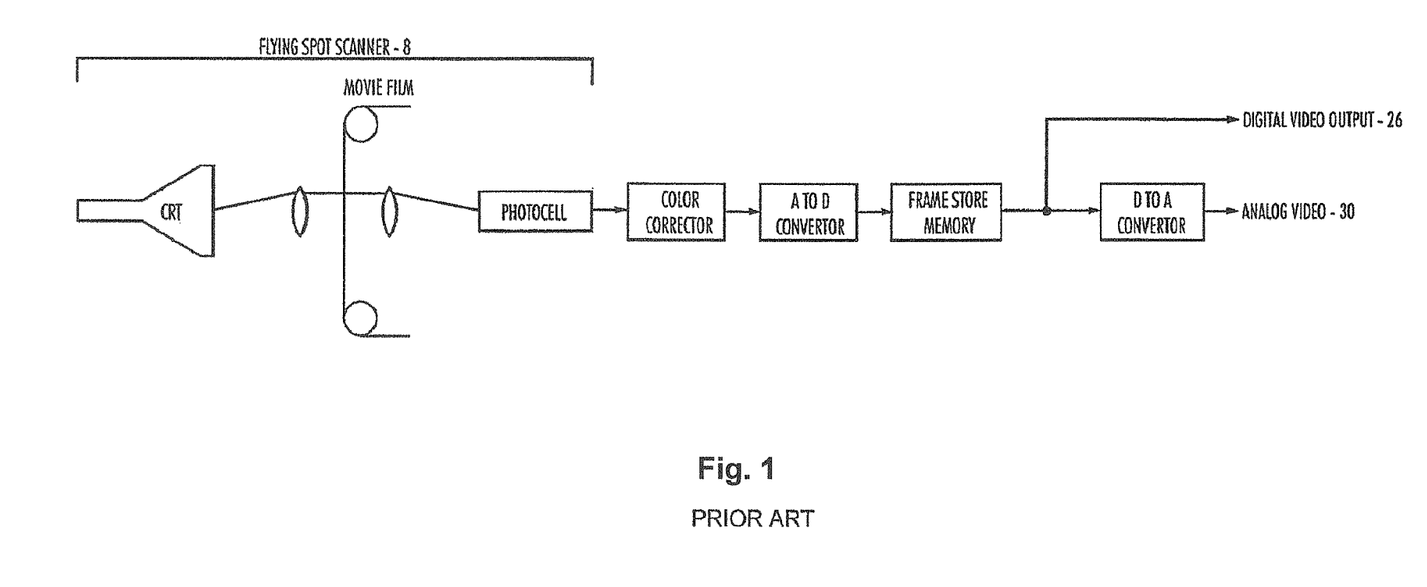
FIG. 1 is a block diagram of a conventional telecine and frame store memory.
Figure 2:
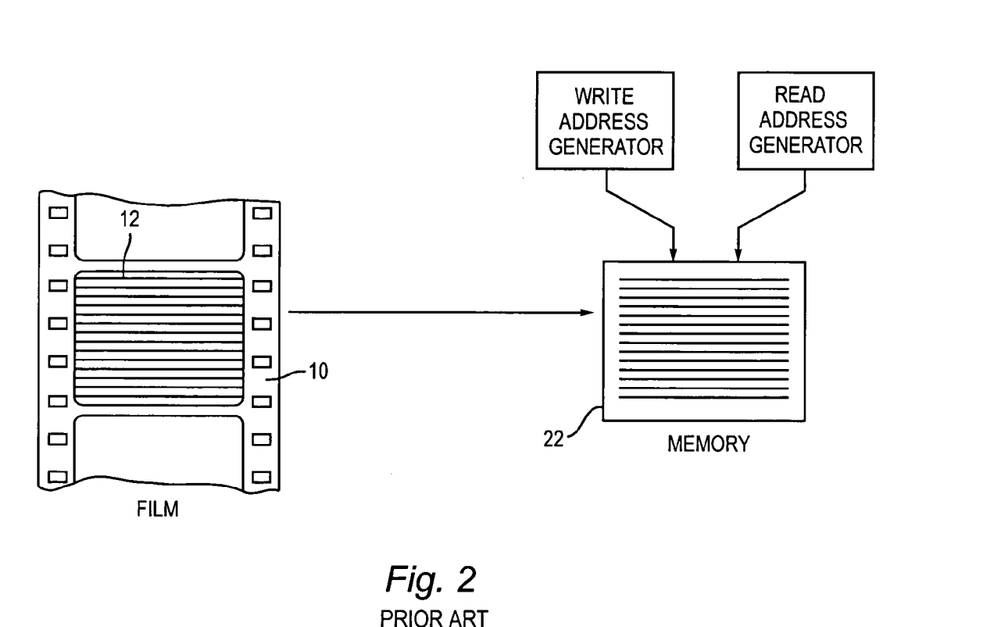
FIG. 2 is a plan view of film and a frame store memory.

Conventionally, motion picture film is converted to an electronic medium by a telecine. The most widely available telecines utilize a flying spot scanner to scan each image of the film. As shown in FIG. 1 and FIG. 2, movie film 10 is scanned in a raster pattern 12. Light from a CRT 14 is focused via lenses 16 onto one or more photo cells 18 after having passed through the film 10. The output of the photo cell 18 constitutes an electronic signal whose intensity corresponds to the progressive scan of the movie film 10. Optionally, a color corrector 20 may vary the electronic signal of the colors as is known in the art. Ordinarily, the output of the telecine is stored in memory. Conventionally, a frame store memory 22 stores a digital version of the image. As necessary, an analog to digital converter 24 is used if the output of the telecine or color corrector is analog.

Current television displays use an interlaced display system. A first field for display on a television will utilize the first, third, fifth and so on, scans from the raster 12, and the second field will use the second, fourth, sixth and so on lines of the raster 12. By storing the progressive scan from the telecine in the frame store memory 22, the interlaced output may be achieved by sequentially addressing the memory 22 for the desired lines. The output from the memory 22 may be either digital video output 26 or, after passing through a digital to analog converter 28, an analog video output 30. The write address generator 32 for the memory 22 generally will sequentially record the raster scan 12. The read address generator 34 will read data from memory 22 in the selected format, such as the interlaced format.

In motion pictures, the aspect ratio (that is, the ratio of the width to the height of the image) is larger than for most current television sets. Motion pictures are often shot in cinemascope format which has an aspect ratio of 2.35:1. Conventional television sets have an aspect ratio of 1.33:1 (4/3). When shooting motion picture film, a special 2:1 anamorphic lens is often used to compress the image onto conventional sized film. Such a 2:1 anamorphic lens results in a 1.175 aspect ratio. Inspection of the film shows images which are squeezed by a factor of 2:1. By way of example, people appear very tall and very thin. When anamorphic film is replayed in the theater, a projection lens expands the picture to the correct proportions.

Figure 3A:
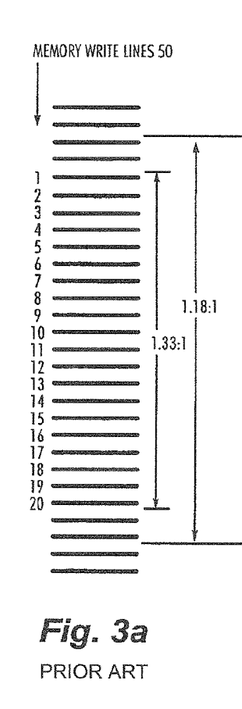
FIG. 3a is a plan view of a raster scan at a conventional scan rate.

When a telecine is used to scan ordinary film for a 1.33:1 aspect ratio, the scan is as shown in FIG. 3a. While literally hundreds of lines are used to scan a single image on a film, for simplicity the image in FIG. 3a shows 28 lines. A scan of film for use in a 1.33:1 aspect ratio display would use lines 1-20 written to the memory 22. As each sequential line is scanned, it is stored in memory 22 at the write address specified by write address generator 32. Extra CRT scan lines are typically present, and are shown above and below scan lines 1-20.

Figure 3B:
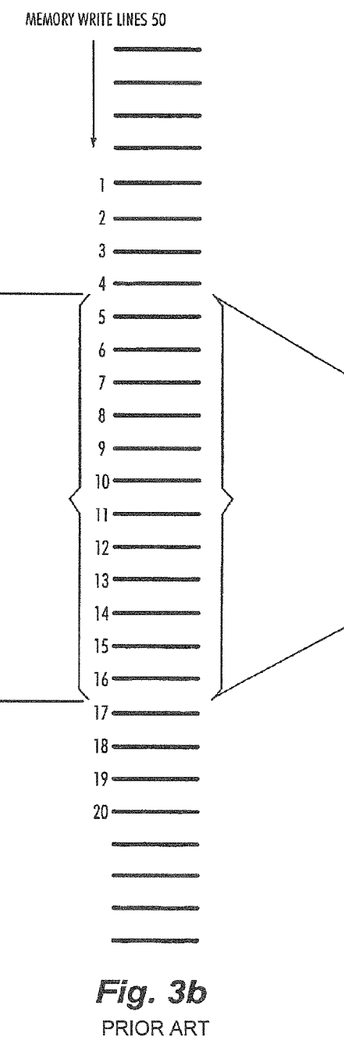
FIG. 3b is a raster scan having an expanded vertical spacing.
Figure 4:
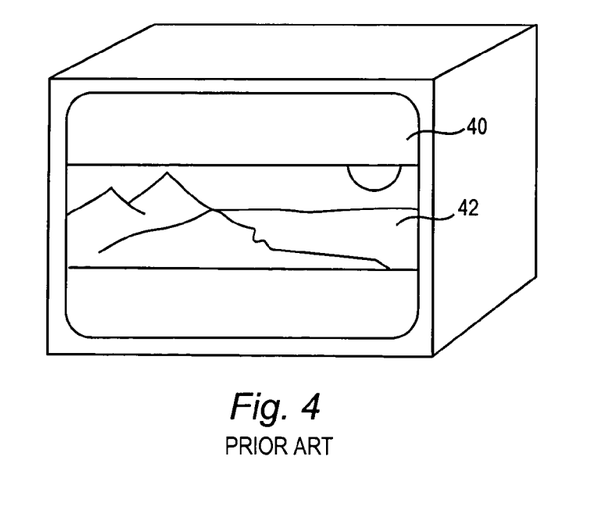
FIG. 4 is a perspective drawing of a monitor showing an image in letterbox format.

Telecines ordinarily, do not utilize an anamorphic lens. Thus, when scanning images recorded with an anamorphic lens, some correction must be made, lest the images appear in their squeezed form. The conventional solution has been to double the vertical raster height of the flying spot scanner 8. FIG. 3b shows the raster scan when expanded by 2:1 in the vertical direction. When scanning an image area of cinemascope film having a 1.18:1 aspect ratio, lines 5-16 (shown bracketed) would be used. By doubling the scan distance, the image is converted back to its normal proportions. However, when the scanned image is then displayed on a television having a 1.33:1 aspect ratio, the image fills only a portion of the screen 40 (FIG. 4). The portions outside the image area 42 are blanked, and appear black. This display is known as a "letterbox" display.

Figure 3C:
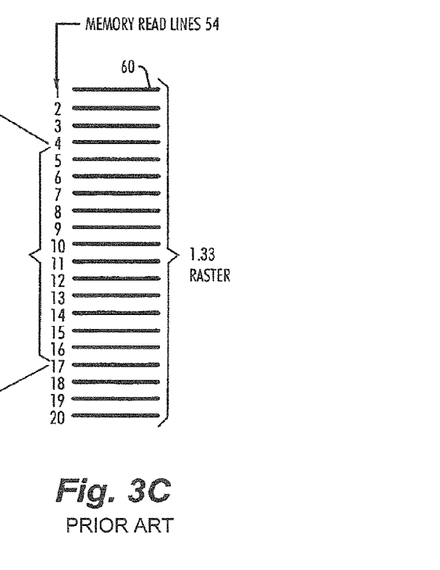
FIG. 3c shows the display for a monitor.

FIG. 3c shows the video output from the memory for the letterbox format. Lines 1-4 and 17-20 will be blanked. For output in the interlaced format, lines 5, 7, 9, and so on would be output in the first frame, and lines 6, 8, 10 and so on would be output in the second frame.

There have been long standing and vexing problems to the image quality utilizing the above described technique and apparatus. The first problem is that a moire pattern, that is, the type of image often seen when two geometrically regular patterns (as when two sets of parallel lines are superimposed especially at an acute angle) may show up on the video image. This is especially pronounced where numerous horizontal lines are shown in the image, bleachers, car grills or certain fabrics. By way of example, as a image pans across bleachers, a moire pattern may travel over the bleachers, clearly creating an image which would not be observed by someone at the actual scene. This lack of realistic representation on video has been a serious problem.

The second problem occurs if the scanning spacing on the telecine matches a spacing on the image. In this event, when an interlaced display is utilized, the image visibly flickers. To consider an extreme example, if the image consisted of alternating horizontal black lines on a white background, and if the telecine scan were such that the odd numbered raster scans were all black and the even numbered raster scans were all white, when played back, because of interlacing, the image would be alternately all black and all white, causing a serious flicker problem.

Yet a third problem resulting from the scanning method utilized in the prior art is that the image quality of the video is visibly degraded. This results from the use of a twice as wide scan, wherein substantial detail may be omitted from the image.

Despite the long standing and vexing nature of these problems, no satisfactory solution has been proposed heretofore.

SUMMARY OF THE INVENTION

An improved method and apparatus for converting anamorphic images to electronic format is provided. The film image is scanned with a progressive raster scan and stored in memory as scan lines. The spacing between progressive scan lines is made smaller than that for conventional anamorphic scanning. When scanning two-toone anamorphic film, the spacing is equal to that used for non-anamorphic film.

Next, the various scan lines are combined from memory with one or more scan lines, preferably adjacent scan lines. In the preferred embodiment, three horizontal lines are combined. The contribution of the various lines may be either with substantially equal weighing (⅓, ⅓, ⅓) or where there is more weighing given to one line versus another (e.g., ¼, ½, ¼). The subsequent video output line is formed by combining a main scan line separated from the prior scan line by more than one scan line. In the preferred embodiment, the main scan lines are separated by three intermediary lines, resulting in a separation of 4.

It is a principal object of this invention to reduce or eliminate moire patterns on video.

It is yet a further object of this invention to reduce or eliminate flicker on video.

It is yet another object of this invention to provide for improved conversion of cinemascope film to video.

It is yet a further object of this invention to provide for improved resolution in the image of a video display formed from an anamorphic film image.

DETAILED DESCRIPTION OF THE INVENTION

Figure 5A:
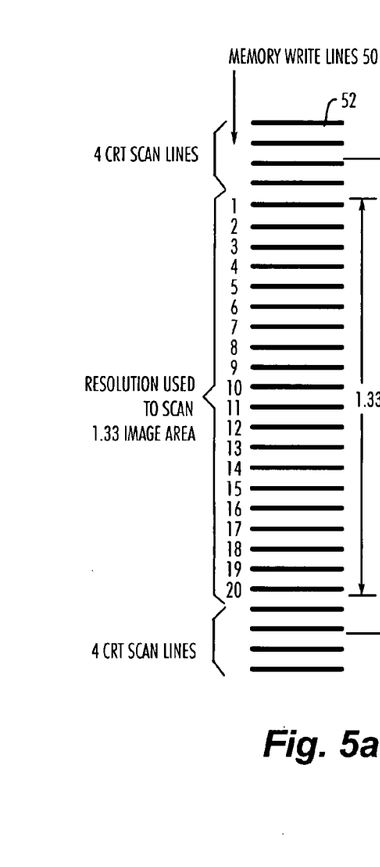
FIG. 5a shows a scan of an image.
Figures 5B, 5C:
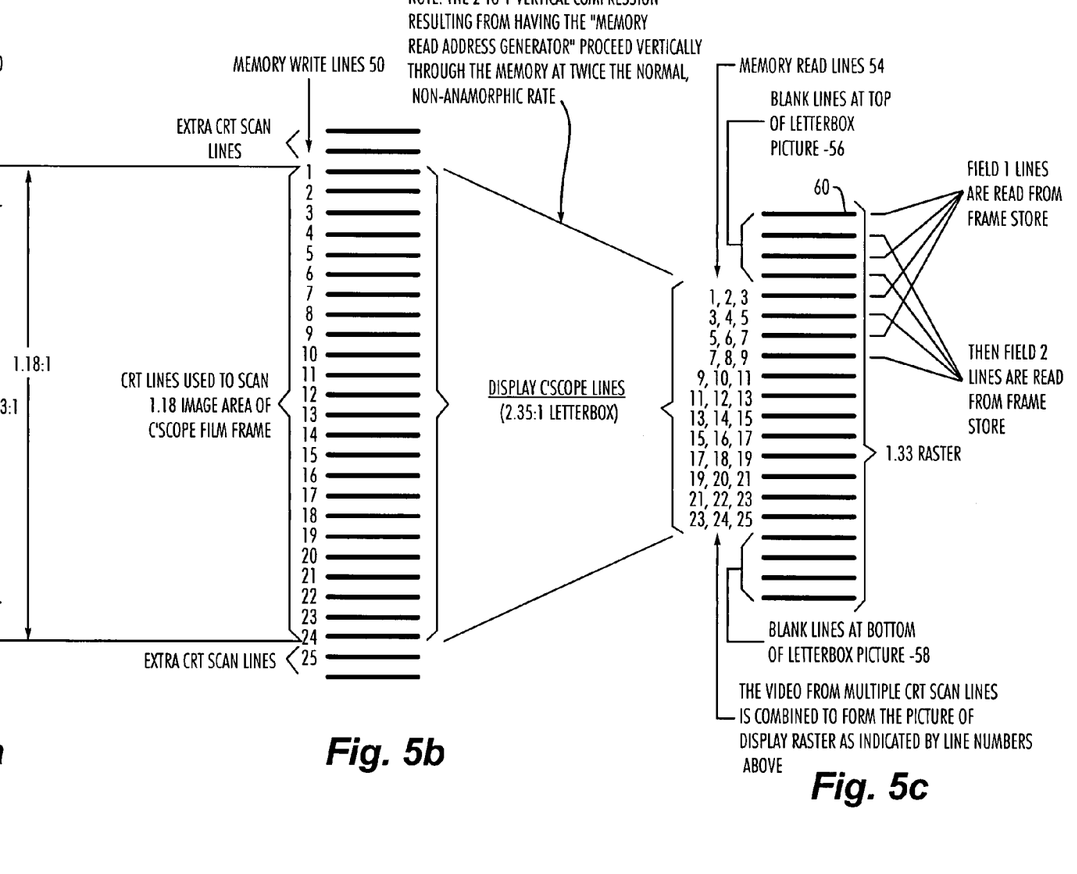
FIG. 5b shows a scan for an image having a 1.18:1 aspect ratio.
FIG. 5c shows a display for a monitor.

FIGS. 5a, 5b and 5c demonstrate the improved method of this invention. FIG. 5a shows the normal raster scan, as described previously in connection FIG. 3a. The memory write lines 50 are shown diagrammatically to the left of the raster scan 52. For an image in the 1.33:1 aspect ratio, lines 1-20 of the memory write lines 50 are utilized. For a image having a 1.18:1 aspect ratio additional lines are utilized as shown. Again, the number of lines actually used is in the hundreds, the images in FIGS. 5a, 5b and 5c using a smaller number of scan lines for clarity.

FIG. 5b shows the scan for the improved method of this invention. Memory write lines 50 are utilized for all of the image area for the 1.18:1 aspect ratio image. As the raster scan is generated, the information is stored in the frame store memory for later read out. In the preferred embodiment, the spacing between the scan lines in FIG. 5b is one-half the spacing in FIG. 3b. It will be appreciated by those skilled in the art that the spacing of FIG. 5b is that which is normally used in scanning a non-anamorphic image. Generally, in accordance with the invention, the spacing between the raster scan lines is made smaller than the spacing between raster scan lines in current anamorphic film scanning. While the spacing is preferably one-half that used in non-anamorphic scanning, the number may be any number smaller than the non-anamorphic spacing. For example, even when scanning 2:1 anamorphic film, it may be desirable to increase the number of scan lines, e.g., to a spacing of one-quarter of the non-amamorphic spacing. In another example, if the anamorphic ratio is other than 2:1, the spacing may be made smaller than the non-amamorphic spacing.

FIG. 5c shows the read memory lines 54 for the letterbox picture format. For display on a monitor 40 (FIG. 4) having a 1.33:1 aspect ratio, the lines 56 above the image 42 in the letterbox format would be blanked. Similarly, the lines 58 below the image 42 in the letterbox format would be blanked. The unblanked lines are called active scan lines. The video output of active scan lines may be found in multiple fields, such as in an interlaced output where two fields are used.

In accordance with the invention, the scanned image stored in the memory is read out and combined with one or more raster scan lines. In the preferred embodiment, three lines are combined, most preferably for a given scan line the nearest neighbor scan lines. However, nearby lines may be combined, and the nearest neighbors ignored, or given a low weighting.

FIG. 5c provides an example of this most favored format. The memory read lines 54 are shown to the left of the read out image 60. The first line read out 62 is composed of the scans at memory write line 50 numbers 1, 2 and 3. If the display is assumed to be interlaced, the next read out line 64 would be composed from memory lines 5, 6 and 7. This would be repeated for the display, generally following the pattern of going four lines down in memory (the first factor of two for the anamorphic correction and the second factor of two for interlaced format) until the end of the image is reached. Continuing to assume the interlaced format, the second TV field in the picture area would be composed from lines 3, 4 and 5 from the memory. The second line of the image would be composed from lines 7, 8 and 9 of memory read lines 54. This image formation would continue throughout the image area of the memory. After the second TV field was completed, the read out would begin again with the line 62 consisting of memory read lines 1, 2 and 3.

The weighing associated with each of the memory lines may be varied at the users discretion. In one preferred mode, the contributions from the lines may be substantially the same, that is, ⅓, ⅓ and ⅓. Alternately, one of the lines may be given preferential weighting, such as in the case where the adjacent lines are sequentially assigned weights of ¼, ½ and ¼. The weights may be changed as desired to produce an optimum image.

Further, while demonstrated with the use of adjacent lines, the technique is readily usable with the combining of two or more lines. Any desired weighing of the various lines may then be utilized to optimize the image.

Figure 6:
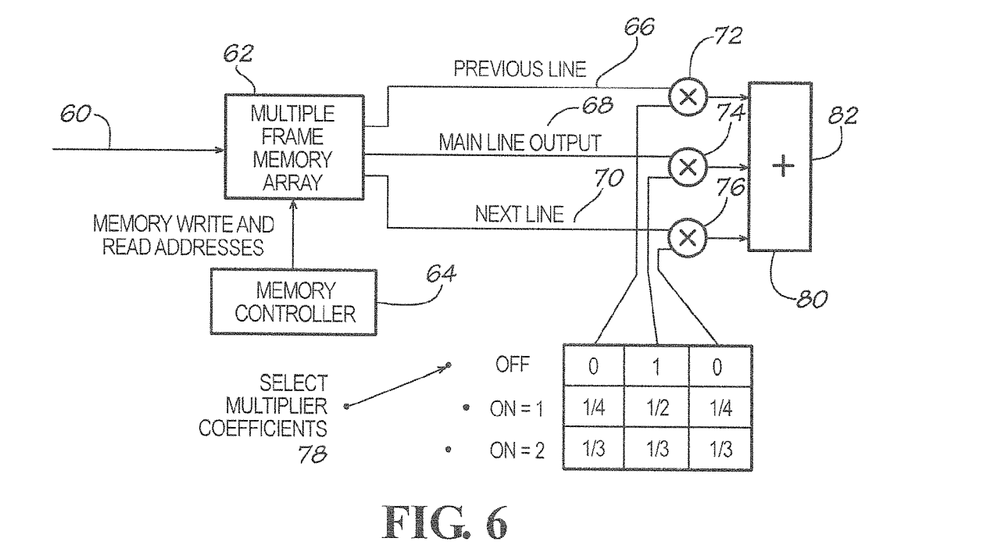
FIG. 6 is a block diagram of the digital video frame store of this invention.

FIG. 6 shows a functional block diagram of the preferred embodiment of hardware for the system. Input 60 receives the digital image from the flying spot scanner 8 and optional color corrector 20 and analog to digital converter 24, as necessary. Frame store memory 62 stores the information received from input 60. The frame memory 62 may comprise any known type of memory. In the preferred embodiment, this memory may be dynamic random access memory (DRAM) or video random access memory (VRAM), field serial access memory (FSAM) or static random access memory (SRAM). One or more memory may be used as desired. In the preferred embodiment, a multiple frame memory 62 is utilized. If three lines of memory are to be combined, typically three separate memories 62 would be utilized.

A memory controller 64 supplies memory write and memory read addresses to the frame memory 62. The output of the frame memory 62 comprises a main line output 68, a previous line output 66 and a next line output 70. In the example of FIG. 5c, the first read out line would be composed of memory read lines 1, 2 and 3. The multiplier coefficients are chosen by selector 78. If in the off position, the output 82 is composed exclusively of the main line output 68. When in position 1, the main line output is weighted ½, with the previously line output 66 and next line output 70 being weighted at ¼. The weighted outputs are combined in the summing block 80 and provided as output 82. When the multiplier coefficient selector 78 is in position number 2 the leading coefficients are ⅓, ⅓ and ⅓. As described above, the coefficients may be chosen as desired, and need not be in these proportions. All of the multiplication, summing and provision of multiplier coefficient 78 may be implemented via known processing techniques through the use of multipliers, summers and microprocessors.

Figure 7:
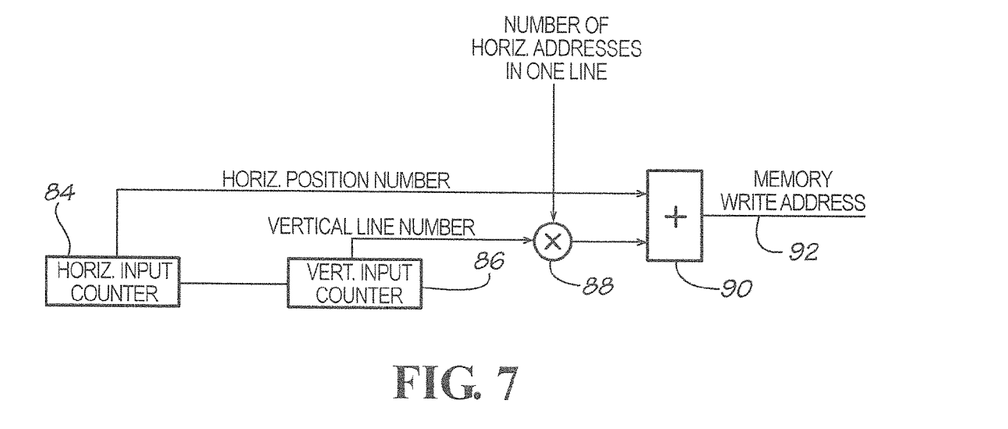
FIG. 7 is a block functional diagram of the write address generator.

FIG. 7 shows a functional block diagram of the write address generator for the memory controller 64. A horizontal input counter 84 addresses each horizontal pixel position or each group of pixels. By way of example, there may be 16 pixels per horizontal address. A vertical input counter 86 addresses each active line in the progressive scanned raster of the flying spot scanner. Multiplier 88 is used to multiply the number of horizontal addresses in one line times the vertical line number. Summer 90 combines the output of the horizontal input counter 84 and the multiplier 88 to form the memory write address 92. When the invention is used in the cinemascope mode, there are more active lines in the progressive scan than in the normal scan for a image in the 1.33:1 aspect ratio.

Figure 8:
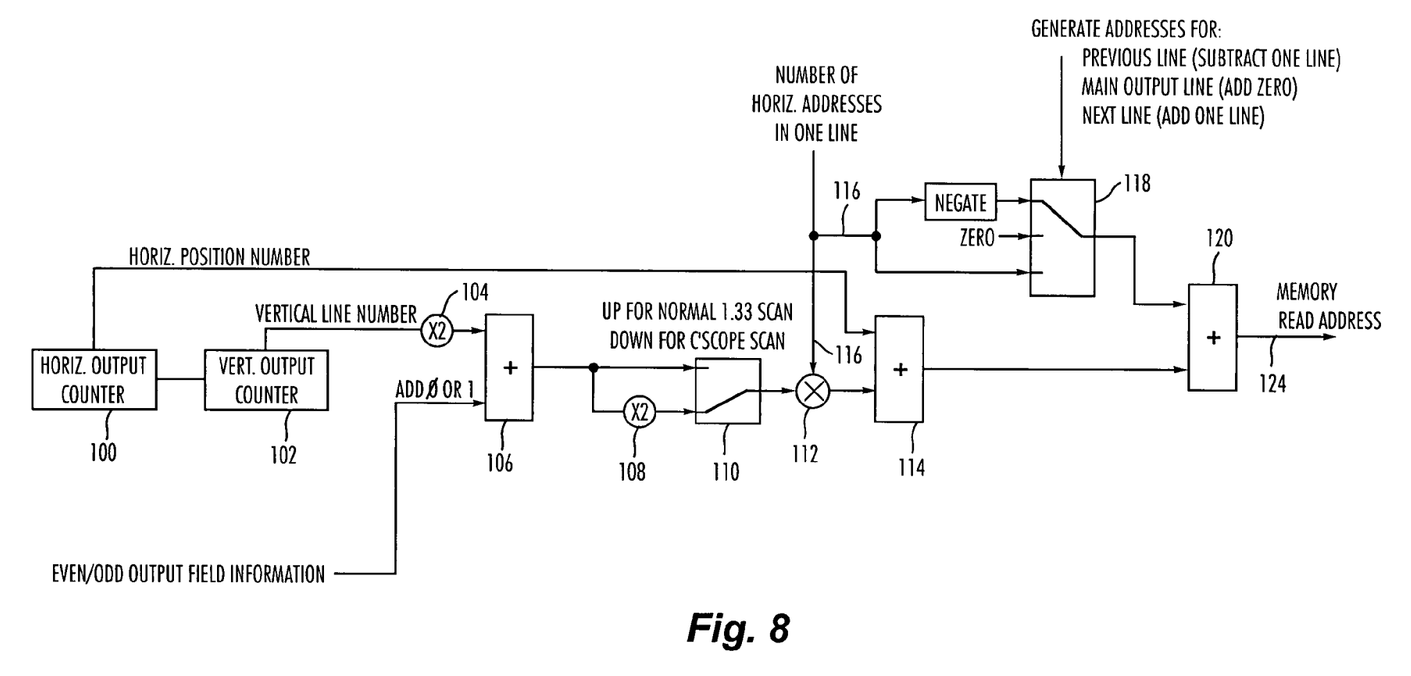
FIG. 8 is a functional block diagram of the read address generator.

FIG. 8 shows a functional block diagram for hardware for the read address generator portion of the memory controller 64. The memory read address 124 is utilized to address the frame memory 62. Generally, the horizontal output counter 100 outputs the horizontal position number. This address may refer to each horizontal pixel position, or to a group of pixels, for example 16 pixels per horizontal address. The vertical output counter 102 addresses each active line in one field of an interlaced output raster. The vertical line number output from the counter 102 is multiplied 104 by 2 to perform the interlace function. In the event that an even output field is to be generated, the zero is added to the output of multiplier 104 in summing unit 106. In the event that an odd output field is to be formed, a 1 is added to the output of multiplier 104 in summing unit 106. The output of the summing unit 106 is provided to multiplier 108. The multiplier corrects for the anamorphic compression of the image. For example, the multiplier 108 is set to a factor of 2 if the original image was shot with a 2:1 anamorphic lens. Selector 110 is set in the up position for a normal image having a 1.33:1 aspect ratio, and down to receive the output of multiplier 108 for correction of an anamorphic image. The output of selector 110 is fed to multiplier 112 which multiplies by a factor equal to the number of horizontal addresses in one line. Summing unit 114 combines the output of multiplier 112 with the horizontal position number. Selector 118 is set to specify whether the addresses are for the main line output 68, the previous line output 66 or the next line output 70. If the previous line output 66 is desired, the input 116 consisting of the number of horizontal addresses in one line is converted to a negative number and provided to summing unit 120. The output of summing unit 114 is combined with the output of selector 118 to provide the memory read address 124.

The memory read address output 124 is provided to the frame memory 62. Generally, the memory will have three simultaneous outputs. This can be achieved with a memory device that has multiple output ports, or alternatively, by three successive reads from the memory 62 with three different read addresses. The data that is read out from the memory 62 can be placed in temporary holding registers until the three reads are complete, at which time the three outputs can be updated simultaneously.

Generally, conventional single port memory devices are slower than required to perform all required read and write cycles in the time required. By reading and writing a group of horizontally adjacent pixels in parallel, for example 16 pixels, they may be placed in temporary registers, and when all three reads are complete and it is time to output pixels, the data in these temporary registers may be transferred simultaneously to 16 bit long shift registers. The shift registers then shift the pixel data out one pixel at a time. Through this method, there is 16 times the amount of time to perform a read or write memory cycle.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

We claim:

1. A method for converting a two-to-one anamorphic film image into a video output signal having multiple video output lines, comprising the steps of:
   (a) scanning the film image in a progressive scan, each scan comprising a scan line, using the non-anamorphic spacing between scan lines,
   (b) storing the scan lines in memory,
   (c) forming a video output line, each one of the video output lines being formed according to the following steps:
      (1) for the first video output line, combining a first scan line with the two scan lines adjacent to the first scan line,
      (2) for subsequent video output lines, combining a subsequent scan line differing from the previous scan line by 2n scan lines, where n equals 1 for a progressive output or 2 for an interlaced output, with the adjacent scan lines to said subsequent scan line, and
      (3) repeating the preceding step (c)(2) until the image is formed into the video output signal.

2. The method of claim 1 for converting an anamorphic film image into a video output signal wherein step (c)(1) and (c)(2) the combining includes weighting of the scan lines.

3. The method of claim 2 wherein the weighting of the scan lines is substantially equal.

4. The method of claim 2 wherein the weighting is unequal.

5. The method of claim 2 wherein the weighting is substantially ½ for the scan line and substantially ¼ for each of the two adjacent lines.

6. The method of claim 1 wherein the video output is interlaced.

7. The method of claim 6 wherein a first and second interlaced field are formed.

8. The method of claim 7 wherein the first scan line of the second interlaced field is 2 lines offset from the first scan line in the first field.

9. A method for scanning film comprising the steps of:
   (a) scanning the film in m-scan lines of a progressive raster scan,
   (b) generating a video output consisting of n active scan lines wherein m is at least twice n, by the following steps:
      (1) combining a first main scan line with one or more other nearby scan lines to form a first video output line, and (2) forming a next video output line by combining a second main scan line with one or more yet another nearby scan lines, where the first main scan line and second main scan line are not adjacent, and (3) repeating the preceding step.

10. The method of claim 9 wherein the said another scan lines are adjacent to said main scan lines.

11. The method of claim 10 wherein the two adjacent lines to a main scan line are combined.

12. The method of claim 9 wherein the combined scan lines are weighted.

13. The method of claim 12 wherein the scan lines are unequally weighted.

14. The method of claim 12 wherein the scan lines are equally weighted.

15. A system for forming a video output signal from anamorphic film comprising:

(a) a raster scan generator system for scanning film at a non-anamorphic rate or greater, (b) a frame store having an input for receiving a digital image signal, an output for outputting multiple digital video signals, and an input for receiving an address, (c) an address generator for selecting nonadjacent scans, (d) means for weighting the output from the frame store, and (e) summing means for combining the output of the weighing means, the output of the summing means forming the video output signal.

16. The system of claim 15 wherein the frame store is random access memory.

17. The system of claim 15 wherein the frame store is DRAM.

18. The system of claim 15 wherein the frame store is VRAM.

19. The system of claim 15 further including a telecine for providing the digital image signal to the input of the frame store.

20. The system of claim 15 wherein the frame store comprises three separate frame stores.

* * * * *

UNITED STATES PATENT AND TRADEMARK OFFICE
CERTIFICATE OF CORRECTION

| | | |
|---|---|---|
| PATENT NO. | : 8,102,419 B1 | Page 1 of 1 |
| APPLICATION NO. | : 08/066996 | |
| DATED | : January 24, 2012 | |
| INVENTOR(S) | : Holland et al. | |

It is certified that error appears in the above-identified patent and that said Letters Patent is hereby corrected as shown below:

On the title page: item [75]
Under Residence of the First Inventor, delete "Granda Hills," and insert --Granada Hills,--.

Claim 15, column 8, line 2, delete "outputing" and insert --outputting--.

Signed and Sealed this
Twelfth Day of June, 2012

David J. Kappos
*Director of the United States Patent and Trademark Office*